(12) United States Patent
Affinito

(10) Patent No.: US 6,358,570 B1
(45) Date of Patent: Mar. 19, 2002

(54) VACUUM DEPOSITION AND CURING OF OLIGOMERS AND RESINS

(75) Inventor: John D. Affinito, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/283,075

(22) Filed: Mar. 31, 1999

(51) Int. Cl.$^7$ ................................ C08J 7/16; C08J 7/06
(52) U.S. Cl. .................. 427/495; 427/496; 427/498; 427/508; 427/512; 427/384; 427/385.5; 427/388.2; 427/404; 427/409
(58) Field of Search ..................... 427/495–496, 427/498, 508, 512, 389, 385.5, 388.2, 404, 409

(56) References Cited

U.S. PATENT DOCUMENTS

| | | | |
|---|---|---|---|
| 3,475,307 A | 10/1969 | Knox et al. .................. 204/168 |
| 3,607,365 A | 9/1971 | Lindlof ........................ 117/100 |
| 4,061,835 A | * 12/1977 | Poppe et al. .............. 427/385.5 |
| 4,098,965 A | 7/1978 | Kinsman .................... 429/153 |
| 4,283,482 A | 8/1981 | Hattori et al. ............... 430/296 |
| 4,521,458 A | * 6/1985 | Nelson ...................... 427/385.5 |
| 4,555,274 A | 11/1985 | Kitajima et al. ........... 148/6.14 |
| 4,557,978 A | 12/1985 | Mason ........................ 428/457 |
| 4,581,337 A | 4/1986 | Frey et al. ................... 436/533 |
| 4,624,867 A | 11/1986 | Iijima et al. .............. 427/255.6 |
| 4,695,618 A | 9/1987 | Mowrer ........................ 528/55 |
| 4,842,893 A | 6/1989 | Yializis et al. ................ 427/44 |
| 4,954,371 A | 9/1990 | Yializis ........................ 427/44 |
| 5,032,461 A | 7/1991 | Shaw et al. .................. 428/461 |

(List continued on next page.)

FOREIGN PATENT DOCUMENTS

| | | |
|---|---|---|
| BE | 704 297 | 2/1968 |
| DE | 196 03 746 | 4/1997 |
| EP | 0 299 753 | 1/1989 |
| EP | 0 340 935 | 11/1989 |
| EP | 0 547 550 | 6/1993 |
| EP | 0 590 467 | 4/1994 |
| EP | 0 390 540 | 8/1994 |
| EP | 0 722 787 | 7/1996 |
| EP | 0 787 826 | 8/1997 |
| EP | 0 916 394 | 5/1999 |
| EP | 0 931 850 | 7/1999 |
| EP | 0 977 469 | 2/2000 |
| JP | 64 18441 | 1/1989 |
| JP | 2 183230 | 7/1990 |
| JP | 08 325 713 | 12/1996 |
| JP | 09 059 763 | 3/1997 |
| JP | 63 136 316 | 6/1998 |
| WO | WO 87/07848 | 12/1987 |
| WO | WO 95/10117 | 4/1995 |
| WO | WO 97/04885 | 2/1997 |
| WO | WO 97/22631 | 6/1997 |
| WO | WO 98/10116 | 3/1998 |
| WO | WO 98/18852 | 5/1998 |
| WO | WO 99/16557 | 4/1999 |
| WO | WO 99/16931 | 4/1999 |

OTHER PUBLICATIONS

Affinito J.D. et al., "PML/oxide/PML barrier layer performance differences arising from use of UV or electron beam polymerization of the PML layers" Thin Solid Films, Elsevier Science S.A., vol. 308–309, Oct. 31, 1997, pp. 19–25.

Affinito J.D. et al., "Polymer–Oxide Transparent Barrier Layers" 39th Annual Technical Conference Proceedings of teh Society of Vacuum Coaters, Vacuum Web Coating Session, 1996, pp. 392–397.

Gustafson G. et al., "Flexible light–emitting diodes made from soluble conducting polymers" Nature, vol. 357, Jun. 11, 1992, pp. 477–479.

Affinito J.D. et al., "High rate vacuum deposition of polymer electrolytes" Journal Vacuum Science Technology A 14(3), May/Jun. 1996, pp. 733–738.

Penning F.M., "Electrical Discharges in Gases" Gordon and Breach Science Publishers, 1965, Chapters 5–6, pp. 19–35; and Chapter 8, pp. 41–50.

Affinito J.D. et al., "Vacuum Deposition Of Polymer Electrolytes On Flexible Substrates" Proceedings of the Ninth International Conference on Vacuum Web Coating, Nov. 1995, ed R. Bakish Bakish Press 1995, pp. 20–36.

Inoue et al., "Fabrication of a Thin Film of MNA by Vapour Deposition" Proc. Jpn. Congr. Mater. Res., vol. 33, 1990, pp. 177–179.

PCT International Search Report regarding International application No. PCT/US 00/03334 dated Jun. 29, 2000.

Vossen J.L. et al., editors, "Thin Film Processes" Academic Press 1978, Part II, Chapter II–1, Glow Discharge Sputter Deposition, pp. 12–63; Part IV, Chapter IV–1, Plasma Deposition of Inorganic Thin Films, pp. 335–360; and Chapter IV–2, Glow Discharge Polymerization, pp. 361–397.

Primary Examiner—Mark F. Huff
Assistant Examiner—Daborah Chacko-Davis
(74) Attorney, Agent, or Firm—Killworth, Gottman, Hagan & Schaeff, L.L.P.

(57) ABSTRACT

The present invention is the formation of solid polymer layers under vacuum. More specifically, the present invention is the use of "standard" polymer layer-making equipment that is generally used in an atmospheric environment in a vacuum, and degassing the liquid material prior to injection into the vacuum. Additional layers of polymer or non-polymer may be vacuum deposited onto solid polymer layers. Formation of polymer layers under a vacuum improves material and surface characteristics, and subsequent quality of bonding to additional layers. Further advantages include use of less to no photoinitiator for curing, faster curing, fewer impurities in the polymer electrolyte, as well as improvement in material properties including no trapped gas resulting in greater density, and reduced material wetting angle that facilitates spreading of the material and provides a smoother finished surface.

10 Claims, No Drawings

U.S. PATENT DOCUMENTS

| | | | |
|---|---|---|---|
| 5,237,439 A | 8/1993 | Misono et al. | 359/74 |
| 5,260,095 A | 11/1993 | Affinito | 427/124 |
| 5,354,497 A | 10/1994 | Fukuchi et al. | 252/299.01 |
| 5,395,644 A | 3/1995 | Affinito | 427/124 |
| 5,427,638 A | 6/1995 | Goetz et al. | 156/153 |
| 5,440,446 A | 8/1995 | Shaw et al. | 361/301.5 |
| 5,536,323 A | 7/1996 | Kirlin et al. | 118/726 |
| 5,547,508 A | 8/1996 | Affinito | 118/50 |
| 5,554,220 A | 9/1996 | Forrest et al. | 117/88 |
| 5,576,101 A | 11/1996 | Saitoh et al. | 428/332 |
| 5,607,789 A | 3/1997 | Treger et al. | 429/90 |
| 5,620,524 A | 4/1997 | Fan et al. | 118/726 |
| 5,629,389 A | 5/1997 | Roitman et al. | 525/534 |
| 5,654,084 A | 8/1997 | Egert | 428/215 |
| 5,681,615 A | 10/1997 | Affinito et al. | 427/255.6 |
| 5,681,666 A | 10/1997 | Treger et al. | 429/90 |
| 5,684,084 A | 11/1997 | Lewin et al. | 524/590 |
| 5,686,360 A | 11/1997 | Harvey, III et al. | 437/211 |
| 5,693,956 A | 12/1997 | Shi et al. | 257/40 |
| 5,711,816 A | 1/1998 | Kirlin et al. | 118/726 |
| 5,725,909 A | 3/1998 | Shaw et al. | 427/412.1 |
| 5,731,661 A | 3/1998 | So et al. | 313/504 |
| 5,747,182 A | 5/1998 | Friend et al. | 428/690 |
| 5,757,126 A | 5/1998 | Harvey, III et al. | 313/506 |
| 5,759,329 A | 6/1998 | Krause et al. | 156/244.13 |
| 5,792,550 A | 8/1998 | Phillips et al. | 428/336 |
| 5,811,177 A | 9/1998 | Shi et al. | 428/209 |
| 5,811,183 A | 9/1998 | Shaw et al. | 428/336 |
| 5,821,692 A | 10/1998 | Rogers et al. | 313/512 |
| 5,844,363 A | 12/1998 | Gu et al. | 313/506 |
| 5,872,355 A | 2/1999 | Hueschen | 250/280.1 |
| 5,902,641 A | 5/1999 | Affinito et al. | 427/255.2 |
| 5,902,688 A | 5/1999 | Antoniadis et al. | 428/690 |
| 5,904,958 A | 5/1999 | Dick et al. | 427/248.1 |
| 5,912,069 A | 6/1999 | Yializis et al. | 428/213 |
| 5,922,161 A | 7/1999 | Wu et al. | 156/272.6 |
| 5,945,174 A | 8/1999 | Shaw et al. | 427/509 |
| 5,948,552 A | 9/1999 | Antoniadis et al. | 428/690 |
| 5,965,907 A | 10/1999 | Huang et al. | 257/89 |
| 5,996,498 A | 12/1999 | Lewis | 101/467 |
| 6,045,864 A | 4/2000 | Lyons et al. | 427/255.23 |
| 6,083,628 A | 7/2000 | Yializis | 428/463 |

\* cited by examiner

VACUUM DEPOSITION AND CURING OF OLIGOMERS AND RESINS

FIELD OF THE INVENTION

The present invention relates generally to a method of vacuum deposition and curing of oligomers and resins useful for making multilayer laminate structures from polymers or polymers in combination with other materials. More specifically, the present invention relates to forming solid polymer laminate layers under vacuum. Additional layers of polymer or non-polymer material may be added under vacuum as well.

As used herein, the term "monomer" is defined as a molecule of simple structure and low molecular weight that is capable of combining with a number of like or unlike molecules to form a polymer. Examples include but are not limited to simple acrylated molecules, for example hexanedioldiacrylate, tetraethyleneglycoldiacrylate; styrene, methyl styrene; and combinations thereof. Monomer molecular weight is generally 1000 or less except for fluorinated monomers of about 2000 or more. Monomers may be combined to form oligomers but do not combine to form other monomers.

As used herein, the term "oligomer" is defined as a compound molecule of at least two monomers that is radiation curable. Oligomer includes low molecular weight resins. Low molecular weight is herein defined as about 1,000 to about 20,000 exclusive of fluroinated monomers. Oligomers are usually liquid or easily liquifiable. Oligomers do not combine to form monomers.

As used herein the term "non-polymer" includes but is not limited to inorganic materials for example metal, oxide, nitride, carbide, fluoride and combinations thereof.

As used herein, the term "resin" is defined as a compound having a higher molecular weight (generally greater than 20,000) and generally solid with no definite melting point, for example polystyrene, epoxy polyamine, phenolic, acrylic resin for example polymethylmethacrylate and combinations thereof.

As used herein, the term "material" is inclusive of oligomer, resin, oligomer plus monomer, resin plus monomer and combinations thereof, but exclusive of monomer.

BACKGROUND OF THE INVENTION

Laminate structures are used in many applications including but not limited to electronic devices, packaging material, and solar reflectors. Laminate structures in electronic devices are found in devices including but not limited to circuit elements and electrochromic devices wherein conductive polymer layers are combined and may include a non-polymer layer. Electrochromic devices include but are not limited to switchable mirrors and switchable windows. Circuit elements include active elements, for example fuel cells and batteries, and passive elements, for example capacitors.

Presently, many laminate structures are made with solid polymer laminate layers. In packaging material and solar reflectors, a metal layer may be added to enhance optical reflectance. In electronic devices, a metal layer may be added to enhance electrical conductivity. In packaging material and solar reflectors, it is not necessary that the polymer layer or layers be conductive, whereas in electronic devices, especially batteries, the polymer layers must be conductive to act as electrolytes, anodes, and cathodes. Certain polymers when doped with selected salts are known to make suitable solid polymer ion conductive layers. Polymers known to be useful include but are not limited to polyethyleneoxide, polypropyleneoxide, polyorgansulfides, and polyanaline. Suitable salts include but are not limited to lithium salts, for example lithium perchlorate, and lithium hexafluoroarsenate. Although the anode, cathode, and electrolyte layers may all be of solid polymer material, when making a lithium polymer battery, it is preferred to have a layer of lithium metal as an anode.

Other polymers having added compounds, including but not limited to conductive powders and dyes, may be made by the present invention.

Presently, mass production of polymer and non-polymer laminate structures used for electronic devices, and especially batteries, relies upon assembling preformed layers of polymer with a thin metal foil. Polymer layers are formed in production quantities by depositing in an atmosphere a thin layer of a liquid mixture containing monomer, oligomer, resin and usually combinations thereof onto a moving substrate that carries the liquid material layer while and until it is cured. Many means for forming polymer layers in an atmosphere are available, including but not limited to physical or mechanical liquid-material spreading apparati; for example, roll coaters, gravure roll coaters, wire wound rods, doctor blades, and slotted dies.

Vacuum deposition of monomer is shown in U.S. Pat. No. 5,260,095 using the physical or mechanical liquid-monomer spreading apparati previously set forth.

In addition means for evaporation and deposition of a monomer vapor, for example polymer multilayer deposition has been done in a vacuum as described in U.S. Pat. No. 5,681,615.

In any means having a moving substrate, the substrate has a velocity different from a nozzle or bath that deposits the liquid material onto the substrate. Hence, the term "moving substrate" as used herein excludes a situation wherein there is no relative motion or velocity differential between substrate and liquid material dispensing means.

The polymer multilayer deposition technique is distinct from liquid-monomer spreading techniques because polymer multilayer deposition requires flash evaporation of the monomer. First, a monomer is atomized into a heated chamber that is under vacuum. Within the heated chamber the monomer droplets are evaporated, then exit the heated chamber, and monomer vapor condenses upon a substrate and is subsequently cured.

Curing may be done by any means including but not limited to heat, infrared light, ultraviolet light, electron beam, and other radiation.

When fabricating a battery, several techniques are used to combine a thin metal layer with a conductive polymer layer. One technique of battery fabrication is to combine a metal foil with a conductive polymer layer by press bonding a metal foil layer to a solid conductive polymer layer. Another technique is to spread uncured liquid material onto a metal foil and subsequently cure the liquid material to form a solid conductive polymer layer. Use of metal foil, especially lithium metal foil, results in minimum metal thicknesses of from about 1.5 mils (40 micrometers) to about 2 mils (50 micrometers).

Other battery fabrication techniques include making a thin metal layer by sputtering, plating, or vacuum depositing metal onto a metal substrate. A conductive polymer is then placed in contact with the metal. Either solid conductive polymer or uncured liquid material may be brought into contact with the metal to form the battery. Polymer laminate structures, including but not limited to batteries, are made by a procedure wherein individual layers are sequentially and separately formed then combined.

The performance and lifetime of polymer/polymer and polymer/non-polymer laminate structures depend upon the quality of bonding between laminate layers. Bonding quality is affected by the presence of small, even microscale, areas of non-bonding at an interface between laminate layers. The bonding is especially critical between dissimilar layers; for example, polymer and metal layers. In batteries, reduced bond quality between polymer and lithium metal layers results in greater internal resistance of a battery produced with the laminate material and potential for "hot spots" upon recharging. In any structure, another problem with bonding dissimilar materials is chemical interaction between the materials. Areas of non-bonding can enhance chemical interaction because they may contain non-inert species or provide different surface characteristics at a boundary between bonded and unbonded areas.

Bonding between layers is therefore of great importance and is enhanced by several means, including but not limited to mechanical presses, and application of a second layer as a liquid with subsequent solidification upon a first solid layer at atmospheric pressure. The difficulty with these methods is that the low cost assembly of pressing or liquid application leads to low quality bonding as identified in U.S. Pat. No. 4,098,965, issued Jul. 4, 1976, to Kinsman, column 1, lines 47–50, wherein he states "[g]ases usually air, [that] are included in the void regions of the battery during assembly . . . ".

It is of great interest to those skilled in the art, then, to make batteries and other products of polymer layers having high bond quality, low permeability, while making them in a cost effective manner.

SUMMARY OF THE INVENTION

The present invention is the formation of solid polymer layers under vacuum. More specifically, according to a first aspect of the present invention, the use of "standard" polymer-layer making equipment, is generally used in an atmospheric environment in a vacuum, and degassing the material prior to injection into the vacuum. Additionally, other layers of polymer or non-polymer material may be vacuum deposited onto solid polymer layers. Non-polymer materials include but are not limited to inorganic materials for example metal, oxide, nitride, carbide, fluoride and combinations thereof.

Advantages of forming polymer layers in a vacuum include use of less to no photoinitiator for curing, faster curing, and fewer impurities in the polymer. Further advantages are improvement in material properties, including no trapped gas, resulting in greater density and reduced material wetting angle that facilitates spreading of the material and provides a smoother finished surface.

According to a second aspect of the invention, fabrication of laminate structures are carried out nearly simultaneously within a single vacuum chamber.

The subject matter of the present invention is particularly pointed out and distinctly claimed in the concluding portion of this specification. However, both the organization and method of operation, together with further advantages and objects thereof, may best be understood by reference to the following detailed description.

DESCRIPTION OF THE PREFERRED EMBODIMENT(S)

The method of the present invention is depositing a thin layer of material onto a moving substrate followed by curing the material and forming the solid polymer layer in a vacuum chamber, and degassing the material prior to depositing the degassed material onto the moving substrate in the vacuum chamber.

The substrate may be a temporary substrate from which the solid polymer layer product is removed after curing, or the substrate may be a permanent substrate forming part of the final product. The permanent substrate can be as simple as a base polymer layer having a metalized surface, for example, a solar reflector. The present invention may be used to place a protective coating upon the metallic surface. The permanent substrate may be as complex as a many-layered monolithic electronic device, for example, a capacitor in which the present invention may be used to place multiple polymer and metal layers to construct the device.

According to the present invention, any polymer-layer making method done in air or other atmosphere may be adapted to be carried out in a vacuum.

The apparatus of the present invention is a combination of known means with additional means that had not been combined prior to the present invention. Apparatus for making a solid polymer layer includes a moving substrate together with means for depositing a thin layer of liquid material onto the moving substrate, followed by means for curing the liquid material and forming the solid polymer. These means are combined with (a) means for creating a vacuum about the moving substrate, and (b) means for degassing the liquid material prior to depositing the degassed liquid material onto the moving substrate in the vacuum.

For making a polymer/non-polymer laminate structure, the non-polymer is vacuum deposited onto a cured solid polymer layer. Alternatively, the non-polymer may be vacuum deposited onto a substrate, then liquid material deposited and spread under vacuum onto the non-polymer surface. Any vacuum deposition technique may be used for the non-polymer material. Vacuum deposition of metal results in metal thickness from about 10 angstroms to usually not more than about 1 mils (25 micrometers), although thickness greater than 1 mil may be desired in certain applications. For making a lithium polymer battery, it is preferred that the cathode and electrolyte are conductive polymer layers and that the anode is lithium metal.

Creating a vacuum about a moving substrate may be done in many ways, including housing an entire solid polymer-making apparatus in a vacuum chamber. Alternatively, a vacuum chamber may contain a moving substrate and a nozzle or coating head penetrating a wall of the vacuum chamber for admitting liquid material.

Degassing of the liquid material may be carried out in many ways, but it is preferred that the material be degassed by stirring it in a sealed vessel and removing residual gas with a vacuum pump. The vacuum pump draws a vacuum of a pressure that removes a sufficient quantity of gas from the liquid material to permit smooth flow of the liquid material through a nozzle into the vacuum chamber with reduced entrained gas expansion, thereby preventing nozzle spitting. The amount of entrained gas must also be sufficiently low to result in an acceptable quality polymer. Acceptable quality includes but is not limited to the final polymer being be free of void spaces and exhibiting a smooth surface.

The vacuum chamber may admit several liquid material and other material inlets for permitting multiple monomer/polymer layers made from monomer, oligomer, resin and combinations thereof, curing means, as well as non-polymer vacuum deposition means. With a multiple inlet vacuum chamber, laminate structures are made in one pass through the chamber. For example, a polymer layer may be cured, then a non-polymer layer deposited, and a subsequent polymer layer covering the non-polymer surface put in place, all within the vacuum chamber. Multiple passes of a product through the vacuum chamber can develop stacks of layered sets.

By placing liquid material spreading and vapor deposition of another layer in the same vacuum chamber, the substrate velocity may be adjusted to accommodate both processes. Additionally, the flow of liquid material through a nozzle may be adjusted to accommodate both processes.

While a preferred embodiment of the present invention has been shown and described, it will be apparent to those skilled in the art that many changes and modifications may be made without departing from the invention in its broader aspects. For example, solid particles may be included as a filler in the liquid material. Filler includes but is not limited to solid monomer, solid oligomer, solid resin, ceramic, graphite, carbon black, and combinations thereof. The appended claims are therefore intended to cover all such changes and modifications as fall within the true spirit and scope of the invention.

I claim:

1. A method of making a first solid polymer layer, comprising the steps of:
    (a) placing a moving substrate into a vacuum chamber, (b) degassing a first liquid material selected from the group consisting of oligomer, resin, oligomer plus monomer, resin plus monomer and combinations thereof to form a degassed first liquid material, and
    (c) depositing a first thin layer of the degassed first liquid material onto the moving substrate within the vacuum chamber, and
        (i) curing said first thin layer.

2. The method as recited in claim 1, further comprising the step of:
    (a) vacuum depositing another material onto said first solid polymer layer.

3. The method as recited in claim 2, further comprising the steps of:
    (a) depositing a second thin layer of a second degassed liquid selected from the group consisting of monomer, oligomer, resin and combinations thereof onto said another material under vacuum,
        and curing said second thin layer.

4. The method as recited in claim 2, wherein the another material is selected from the group consisting of metals, oxides, nitrides, carbides, fluorides, and combinations thereof.

5. The method as recited in claim 1, further comprising the steps of:
    (a) depositing a second thin layer of a second degassed liquid selected from the group consisting of monomer, oligomer, resin and combinations thereof onto said first solid polymer layer under vacuum,
        and curing said second thin layer.

6. The method as recited in claim 1, wherein said first liquid material includes a filler.

7. The method as recited in claim 6, wherein the filler is selected from solid monomers, solid oligomers, solid resins, ceramics, graphite, and carbon black, and combinations thereof.

8. The method as recited in claim 1, wherein said first liquid material is selected from the group consisting of oligomer, resin and combinations thereof.

9. The method as recited in claim 1, wherein the monomer is selected from the group consisting of acrylated molecules, styrene, methyl styrene, and combinations thereof.

10. The method as recited in claim 1, wherein the resin is selected from the group consisting of polystyrene, epoxy polyamine, phenolic, acrylic, and combinations thereof.

* * * * *

UNITED STATES PATENT AND TRADEMARK OFFICE
CERTIFICATE OF CORRECTION

PATENT NO. : 6,358,570 B1
DATED : March 19, 2002
INVENTOR(S) : John D. Affinito

It is certified that error appears in the above-identified patent and that said Letters Patent is hereby corrected as shown below:

Column 5,
Line 36, delete "(i)";

Column 6,
Line 24, after "selected from", insert -- the group consisting of --; and
Line 26, delete "and" first occurrence.

Signed and Sealed this

Twenty-ninth Day of October, 2002

Attest:

JAMES E. ROGAN
Attesting Officer
Director of the United States Patent and Trademark Office